Feb. 17, 1931. F. F. LANDIS 1,792,914
SHOCK DIFFUSER
Filed May 29, 1928 2 Sheets-Sheet 1
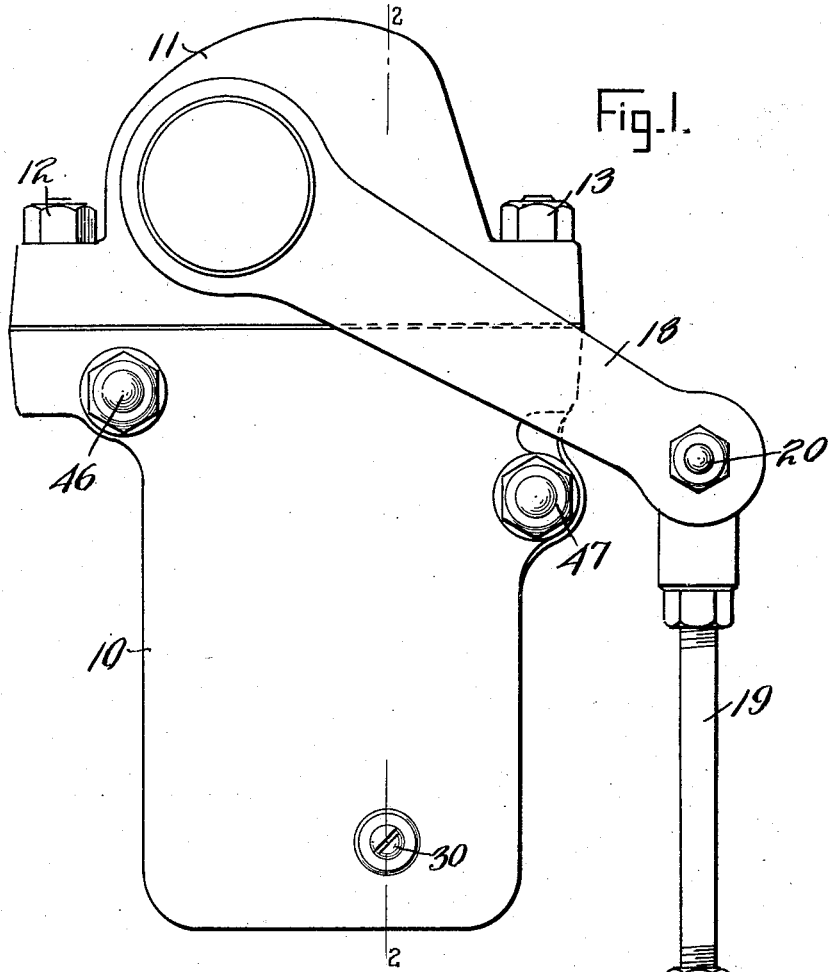
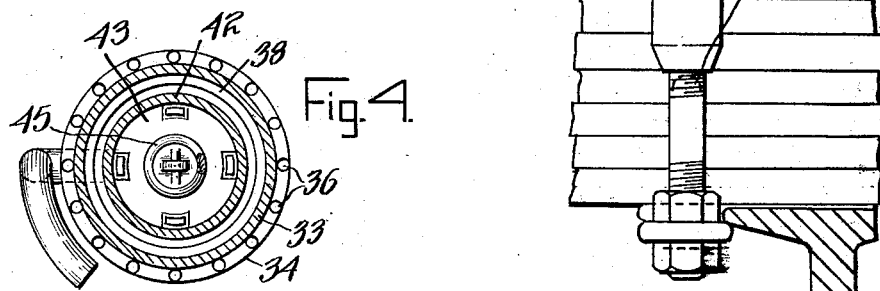
Inventor
Frank F. Landis
By E. W. Bradford
Attorney Feb. 17, 1931.  F. F. LANDIS  1,792,914
SHOCK DIFFUSER
Filed May 29, 1928  2 Sheets-Sheet 2
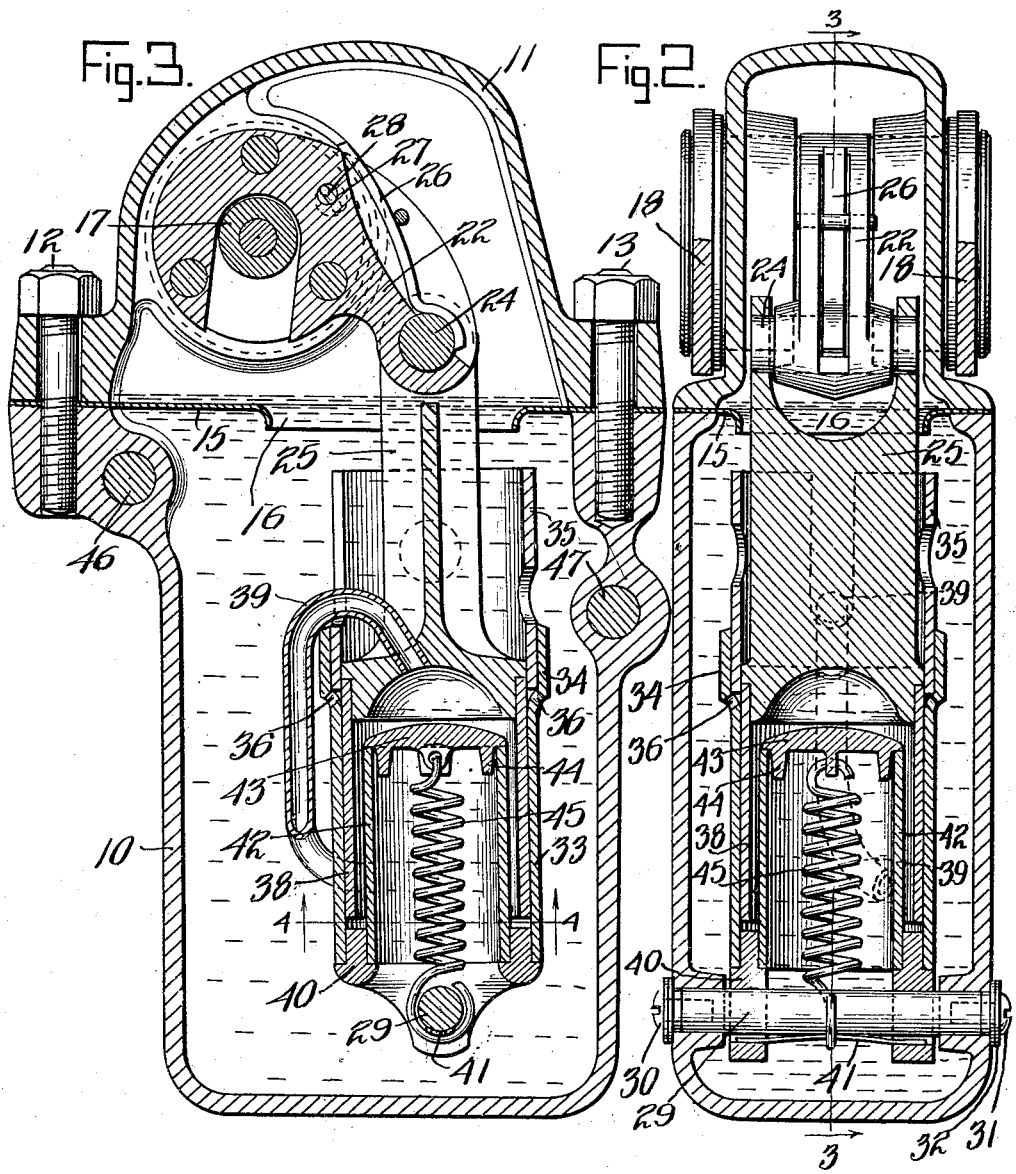
Inventor
Frank F. Landis
By [signature] Attorney Patented Feb. 17, 1931

1,792,914

UNITED STATES PATENT OFFICE

FRANK F. LANDIS, OF WAYNESBORO, PENNSYLVANIA, ASSIGNOR TO FRANK F. LANDIS PATENTS, INCORPORATED, OF WAYNESBORO, PENNSYLVANIA, A CORPORATION OF PENNSYLVANIA

SHOCK DIFFUSER

Application filed May 29, 1928. Serial No. 281,574.

My invention relates to shock diffusers or shock absorbers. It is an object of the invention to provide an inexpensive shock diffusing device so compact in form as to adapt it particularly to light weight cars, carriages and for use on automobiles where clearance spaces are small, where the shock diffuser would normally be mounted on the frame.

A further object of the invention is to provide a shock diffuser in which the body of oil contained therein will not be so churned up or agitated as to have the air and oil mixed together.

Further advantages and objects of the invention will be revealed as the description proceeds.

Referring to the accompanying drawings which are made a part hereof and on which similar reference characters indicate similar parts, Figure 1 is a side elevation of the device,
Figure 2, a vertical section on line 2—2 Figure 1,
Figure 3, a vertical section on line 3—3, of Figure 2, and
Figure 4, a section on line 4—4, Figure 3.

In the drawings numerals 10 and 11 indicate casing elements in which the shock diffuser is mounted. These elements are secured together by bolts 12 and 13, securing therebetween a plate 15 having a central opening 16 therein. Journaled in the upper part of the casing 11 is a shaft 17 extending out of the casing and having arms 18 secured rigidly thereto. The outer ends of the arms 18 have a depending link or rod 19 pivoted to the arm 18 at 20 and secured at 21 to the lower elements of the springs on an automobile or the like, or secured to any vertically movable member of the machine as is well known. An arm 22 is secured by means of bolts to a flange on the shaft 17 within the housing member 11. This member is pivotally connected to a shaft 24 secured in the piston rod or shank 25. A spring 26 with its upper end resting in a slot on the arm 22 and its lower end against shaft 24 holds the shaft 24 and the arm 22 against relative oscillation preventing lost motion. Likewise, a spring 27 positioned against a pin 28 prevents relative movement of the arm 22 and the shaft 17 to take up any unnecessary play between the two members and to absorb lost motion in the direction of automobile spring recoil.

A shaft 29 passes through the lower end of the outer casing 10 and is secured against axial movement on the casing by means of screws 30 and 31. Packing elements 32 are preferably held beneath the screw heads to prevent leakage of oil around the shaft. Journaled upon this shaft is a cylinder 33 which extends up within the casing 10. This cylinder has a flared upper portion 34 in which is tightly fitted another cylindrical element 35. The members 34 and 35 are so fitted together that the inner walls of the two are aligned so as to provide a single cylindrical chamber. The cylinder 33 has a series of downwardly directed perforations 36 around it just below the bottom of the flared out portion 34, the perforation 36 being also just below the lower end of the cylindrical element 35. In operation the perforations 36 provide for returning any oil leaking past the piston back to the body of oil. The piston rod or shank 25 has tightly fitted on its lower end a cylindrical piston 38 which fits neatly but slidingly within the cylinders 35 and 33. The enlarged lower end of the member 25 has a pipe 39 extending out through its upper side and bending down to a position near the lower end of the outer cylinder 33. The lower end of the pipe 39 is also bent in a horizontal position in order to direct fluid which may flow therethrough in a downwardly direction and tangential to the cylinder.

The cylindrical member 33 is tightly fitted upon member 40 by which it is journaled upon the shaft 29. A leaf spring 41 has its ends positioned in notches or key ways in the members 40, and its middle portion bent up to rest against the shaft 29. This spring 41 takes up any lost motion or play between the cylinder 33 and the shaft 29. Positioned within the members 40 is a smaller cylinder 42, having a valve 43 upon its upper end. This valve 43 has depending lugs 44 which assist in keeping it in position on the upper end of the cylinder 42. A tension spring 45 is secured to the valve and the shaft 29 and serves to hold it in position.

The device as a whole may be secured upon the frame of a car by means of bolts 46 and 47.

The operation of the device is as follows:

The casing 10 is filled with oil substantially to the level of the plate 15. The device is then ready for operation. In use the arm 22 may be suddenly moved upwards through the arm 18 in contact with some jostling portion of the machine. The piston 38 as shown in Figures 2 and 3 is free to move upward, and when so moving will draw oil up through the casing 42 past the valve 43. The oil trapped between the lower end of the piston and the valve 43 will prevent rapid return of the piston and will force the oil trapped beneath the end of the piston through the pipe 39 into the chamber 10. Since 39 is a restricted passage it will allow the piston to return slowly and thus ease or cushion the effect of the return movement. Such leakage of oil as occurs between the cylindrical piston 38 and the cylinder 33 in which it fits may escape through the downwardly directed perforations 36 surrounding the cylinder 33 just below the flared portion at its upper end. It will therefore be seen that the device will operate at all times without directing oil toward the surface of the oil level in the casing. This prevents agitation of the oil on the surface and thus beating it into a froth containing air bubbles. The result is that the cushion device works uniformly and without any sudden movements in the return direction.

It should be noted that the oil issuing from the lower end of the pipe 39 passes downwardly and will return up through the lower end of the cylinder 42. The oil therefore travels always in one direction. This lessens disturbance in the oil and tends to avoid air pockets with their injurious effects. The avoidance of gas and air pockets in the oil and the absorption of all lost motion in the joints results in a shock distributor that comes into play at the instant of automobile spring recoil.

It should be noted also that the amount of oil under compression above the valve 43 is a very small portion of the whole body of oil. The heat due to compression is very readily absorbed by the large body of oil and dissipated through the walls of the container 10.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent is:

1. A shock diffuser comprising a casing, a cylinder within and pivotally mounted to said casing, a piston movable within said cylinder, a valve in said cylinder, means for reciprocating said piston within said cylinder, a downwardly directed port within said piston and a pipe connecting said port with the lower portion of said casing, said pipe having its lower end bent downwardly and tangentially to the cylinder, substantially as set forth.

2. A shock diffuser comprising casing elements detachably secured together, a cylinder pivotally mounted in one of said casing elements, said cylinder comprising upper and lower telescoping members the lower member having a series of perforations adjacent the lower end of the upper member, a second cylinder secured within the first named cylinder and having a spring seated valve positioned upon its upper end, a cylindrical piston reciprocably mounted in the first named cylinders, the said piston having a port extending to its inner side, a pipe connecting said port with the lower portion of the said casing element, means operably connecting said piston with a movable member for moving it in one direction, and means for biasing said piston in the opposite direction, and means for limiting its movement in the last named direction, substantially as set forth.

3. A shock diffuser comprising a casing containing liquid, a cylinder mounted within said casing, a check valve in said cylinder, a plunger movably mounted within said cylinder, the said piston having a port therethrough, a pipe connecting said port and extending well down in the body of oil in said chamber, and a series of downwardly directed perforations around said cylinder, means for moving said piston in one direction, means for biasing it in the opposite direction, its movement in the last named direction being restricted by the liquid between the said valve and said piston, substantially as set forth.

4. A shock diffuser comprising a casing containing liquid, a cylinder pivotally mounted within said casing, a cylindrical piston reciprocably mounted within said cylinder, a valve in said cylinder, means for moving said piston in one direction, means for biasing it in the opposite direction, means for absorbing lost motion during the said last named movements, and said cylinder having a plurality of downwardly directed ports whereby leakage of liquid past said piston and cylinder will be directed downwardly into the body of liquid in said casing, and means for restricting the flow of liquid between said piston and said valve on the downward movement of said piston, substantially as set forth.

In witness whereof, I have hereunto set my hand at Miami Beach, Florida this 22nd day of May, A. D. nineteen hundred and twenty-eight.

FRANK F. LANDIS.